(12) United States Patent
Sato et al.

(10) Patent No.: US 12,109,950 B2
(45) Date of Patent: Oct. 8, 2024

(54) ATTACHMENT DEVICE

(71) Applicant: TOKYO COSMOS ELECTRIC CO., LTD., Zama (JP)

(72) Inventors: Takeshi Sato, Kanagawa (JP); Takayuki Hioki, Kanagawa (JP)

(73) Assignee: TOKYO COSMOS ELECTRIC CO., LTD., Zama (JP)

( * ) Notice: Subject to any disclaimer, the term of this patent is extended or adjusted under 35 U.S.C. 154(b) by 147 days.

(21) Appl. No.: 17/799,709

(22) PCT Filed: Dec. 21, 2020

(86) PCT No.: PCT/JP2020/047651
§ 371 (c)(1),
(2) Date: Aug. 15, 2022

(87) PCT Pub. No.: WO2021/166414
PCT Pub. Date: Aug. 26, 2021

(65) Prior Publication Data
US 2023/0060268 A1  Mar. 2, 2023

(30) Foreign Application Priority Data
Feb. 18, 2020 (JP) ................. 2020-025232

(51) Int. Cl.
| | | |
|---|---|---|
| *B60R 11/04* | (2006.01) | |
| *G02B 27/00* | (2006.01) | |
| *G03B 17/56* | (2021.01) | |
| *H04N 23/50* | (2023.01) | |
| *B60R 11/00* | (2006.01) | |
| *B60S 1/02* | (2006.01) | |
| *B60S 1/56* | (2006.01) | |

(52) U.S. Cl.
CPC .......... *B60R 11/04* (2013.01); *G02B 27/0006* (2013.01); *G03B 17/561* (2013.01); *H04N 23/50* (2023.01); *B60R 2011/0026* (2013.01); *B60S 1/026* (2013.01); *B60S 1/56* (2013.01)

(58) Field of Classification Search
None
See application file for complete search history.

(56) References Cited

U.S. PATENT DOCUMENTS

| | | | |
|---|---|---|---|
| 9,961,240 B2* | 5/2018 | Wato | G06V 20/56 |
| 10,397,982 B2* | 8/2019 | Usami | B60R 11/04 |
| 2016/0119509 A1 | 4/2016 | Wato | |

(Continued)

FOREIGN PATENT DOCUMENTS

| | | |
|---|---|---|
| JP | 2017185896 A | 10/2017 |
| JP | 6303974 B2 | 3/2018 |

(Continued)

OTHER PUBLICATIONS

International Search Report for International Application No. PCT/JP2020/047651; Date of Mailing, Feb. 22, 2021.

*Primary Examiner* — Rodney E Fuller
(74) *Attorney, Agent, or Firm* — CANTOR COLBURN LLP

(57) ABSTRACT

An attachment device that suppresses a decrease in the detection accuracy of a sensor. This attachment device is designed to attach a sensor to one surface side of a transmission plate such that the sensor can detect a transmitted wave transmitted from the other surface side.

5 Claims, 4 Drawing Sheets

(56) References Cited

U.S. PATENT DOCUMENTS

2017/0295610 A1 10/2017 Usami et al.
2019/0176762 A1* 6/2019 Ooji .................... H05B 3/84
2021/0263305 A1 8/2021 Kasetani

FOREIGN PATENT DOCUMENTS

WO     WO-2019098261 A1 * 5/2019 ............. B60R 11/04
WO     WO-2020022520 A1 * 1/2020 ............. B60R 11/04

* cited by examiner

# ATTACHMENT DEVICE

CROSS REFERENCE TO RELATED APPLICATIONS

This is the U.S. national stage of application No. PCT/JP2020/047651, filed on Dec. 21, 2020. Priority under 35 U.S.C. § 119(a) and 35 U.S.C. § 365(b) is claimed from Japanese Application No. 2020-025232, filed Feb. 18, 2020, the disclosure of which is also incorporated herein by reference.

TECHNICAL FIELD

The present disclosure relates to an attachment apparatus.

BACKGROUND ART

To attach a sensor, such as a camera, to a vehicle, for example, an attachment apparatus has been practically used. The attachment apparatus is provided so as to fix a camera on the compartment side against a windshield of a vehicle, and the fixed camera can capture an image of the outside of the vehicle through the windshield.

The windshield is sometimes fogged up due to the temperature difference between the compartment and the outside of the vehicle, for example, and the windshield fogging possibly prevents the camera from capturing an image clearly.

With this regard, Patent Literature 1 has proposed, as a technique to remove the windshield fogging, an in-vehicle camera device that prevents fogging in a section of a windshield in front of a camera device. This in-vehicle camera device is capable of removing the windshield fogging with a heating wire placed to heat the windshield.

CITATION LIST

Patent Literature

PTL 1
Japanese Patent No. 6303974

SUMMARY OF INVENTION

Technical Problem

In the in-vehicle camera device in PTL 1, however, the heating wire is placed between the camera and the windshield, so that the heating wire may interfere with image capturing of the camera and the image capturing accuracy of the camera is possibly sacrificed.

It is an object of the present disclosure to provide an attachment apparatus that prevents deterioration of detection accuracy of a sensor.

Solution to Problem

An attachment apparatus according to the present disclosure is an attachment apparatus that attaches a sensor on a side of one surface of a transparent plate so as to detect a transmitted wave transmitted from a side of another surface of the transparent plate, the attachment apparatus comprising: a supporting section that is fixed between the transparent plate and the sensor, and is formed with a bent section recessed in a direction away from the transparent plate, the bent section being formed with a window section facing an opening section of the bent section to expose the sensor to a side of the transparent plate, the bent section including a facing surface formed so as to face the transparent plate while being away from the opening section toward the window section; a heating section that is placed on a back surface on an opposite side of the facing surface of the bent section; and a conducting section that is placed so as to extend along the facing surface, and conducts, along the facing surface, heat conducted from the heating section, wherein, the heat conducted by the conducting section is dissipated toward the transparent plate.

Advantageous Effects of Invention

According to the present disclosure, it is possible to prevent deterioration of detection accuracy of a sensor.

DESCRIPTION OF EMBODIMENTS

Hereinafter, embodiments of the present disclosure will be described in detail with reference to the accompanying drawings.

Embodiment 1

Figure 1:
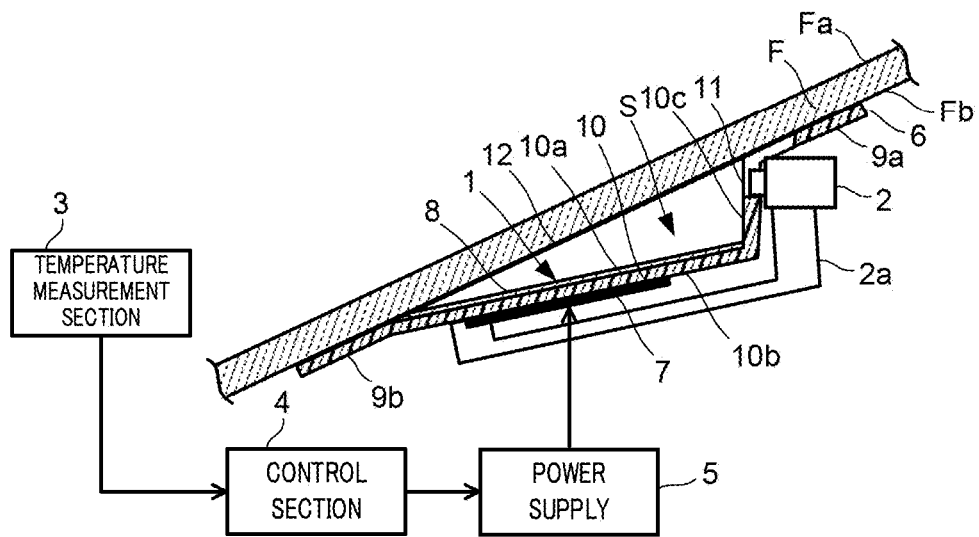
FIG. 1 illustrates a configuration of a sensor apparatus including an attachment apparatus according to Embodiment 1 of the present disclosure.

FIG. 1 illustrates a configuration of a sensor apparatus including an attachment apparatus according to Embodiment 1 of the present disclosure. The sensor apparatus includes attachment apparatus 1, image capturing section 2, temperature measurement section 3, control section 4, and power supply 5.

Attachment apparatus 1 is for attaching image capturing section 2 on the side of surface Fb in a vehicle compartment so as to detect light transmitted through windshield F of the vehicle from the side of surface Fa outside the vehicle, and includes supporting section 6, heating section 7, and conducting section 8.

Supporting section 6 is placed between windshield F and image capturing section 2 and includes fixing sections 9*a* and 9*b* and bent section 10. Supporting section 6 can be made of, for example, a synthetic resin with heat resistance. In addition, supporting section 6 can be formed in a color not affecting image capture of image capturing section 2, for example, black.

Fixing section 9*a* is placed at the upper edge of supporting section 6, and is formed in a flat plate shape so as to make contact with surface Fb of windshield F. Fixing section 9*a* is fixed to windshield F with adhesive, for example.

Fixing section 9b is placed at the lower edge of supporting section 6, and is formed in a flat plate shape so as to make contact with surface Fb of windshield F. Fixing section 9b is fixed to windshield F with adhesive, for example.

Bent section 10 is placed between fixing section 9a and fixing section 9b, and is formed so as to be recessed in the direction away from windshield F, that is, toward the vehicle compartment. Bent section 10 is formed with window section 11 that penetrates the upper portion of bent section 10 and exposes image capturing section 2 to the windshield F side. Window section 11 is formed to face opening section 12 of bent section 10. Bent section 10 includes facing surface 10a formed so as to face windshield F while gradually being away from opening section 12 toward window section 11, and back surface 10b placed on the opposite side of facing surface 10a. In addition, bent section 10 includes side surface 10c erected from facing surface 10a toward windshield F, and window section 11 is formed on the upper portion of side surface 10c.

This allows bent section 10 to form detection space S corresponding to an image capturing area of image capturing section 2 in front of image capturing section 2.

Heating section 7 is placed along back surface 10b of bent section 10 and heats bent section 10 from the back surface 10b side.

Conducting section 8 conducts heat conducted from heating section 7 through bent section 10 along facing surface 10a. Conducting section 8 is formed in a flat plate shape with uniform thickness and placed so as to extend along facing surface 10a of bent section 10. Conducting section 8 dissipates the heat conducted along facing surface 10a, toward windshield F to detection space S. Conducting section 8 is made of a material with high thermal conductivity, and can be made of, for example, aluminum, copper, etc. Additionally, conducting section 8 can be formed in a color not affecting image capture of image capturing section 2, for example, painted in black.

Image capturing section 2 detects transmitted light passing through windshield F to capture an image of the outside of the vehicle, and is placed so as to have supporting section 6 between windshield F and itself. Its lens is exposed to the windshield F side from window section 11 formed on bent section 10. Image capturing section 2 can be composed of a camera, for example.

Image capturing section 2 is held to supporting section 6 by holding section 2a. Holding section 2a is placed so as to extend from back surface 10b of supporting section 6 toward window section 11 and has one end fixed to back surface 10b of supporting section 6 and the other end fixed to image capturing section 2.

Temperature measurement section 3 measures the temperature outside the vehicle, and can be composed of a thermometer, for example.

Power supply 5 supplies power to heating section 7 to heat heating section 7.

Control section 4 turns power supply 5 on and off based on the temperature measured by temperature measurement section 3, and controls the heating of windshield F by heating section 7.

Next, a configuration of supporting section 6 will be described in detail.

Figure 2:
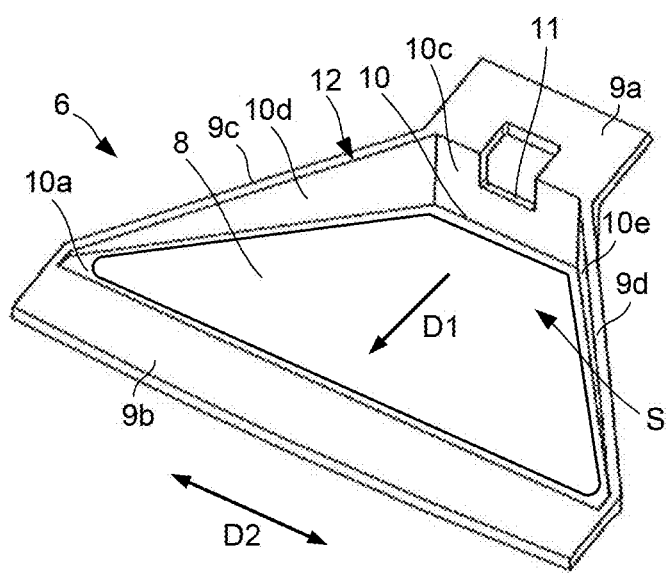
FIG. 2 illustrates a configuration of a supporting section on the facing surface side.

FIG. 2 illustrates a configuration of supporting section 6 on the side of facing surface 10a.

Bent section 10 includes three side surfaces 10c, 10d and 10e erecting from facing surface 10a toward windshield F. Side surface 10c is placed to connect between the back of facing surface 10a and fixing section 9a. Side surface 10d is placed on the right side of detection direction D1 in which image capturing section 2 captures an image and is formed so as to extend rightward facing detection direction D1 from side surface 10c. Side surface 10e is placed on the left side of detection direction D1 and is formed so as to extend leftward facing detection direction D1 from side surface 10c. That is, side surface 10d and side surface 10e are formed so as to be gradually separated in right-left direction D2 from the window section 11 side toward detection direction D1.

The upper edge of side surface 10d is provided with fixing section 9c that makes contact with surface Fb of windshield F. Also, the upper edge of side surface 10e is provided with fixing section 9d that makes contact with surface Fb of windshield F. That is, fixing sections 9a to 9d are placed so as to surround opening section 12 of bent section 10. Fixing sections 9c and 9d are fixed to windshield F with adhesive, for example.

Facing surface 10a is formed to have a trapezoidal shape, gradually spreading in right-left direction D2 from side surface 10c to fixing section 9b, according to the shapes of side surfaces 10d and 10e. Here, the spreading of facing surface 10a and side surfaces 10d and 10e in right-left direction D2 is set in accordance with the spreading of the detection range of image capturing section 2, and this forms predetermined detection space S.

In addition, conducting section 8 is placed on facing surface 10a, and is formed so as to gradually extend in right-left direction D2 from the window section 11 side toward detection direction D1 along facing surface 10a. That is, conducting section 8 has a trapezoidal shape corresponding to facing surface 10a, and is formed so as to cover almost the entire surface of facing surface 10a.

Figure 3:
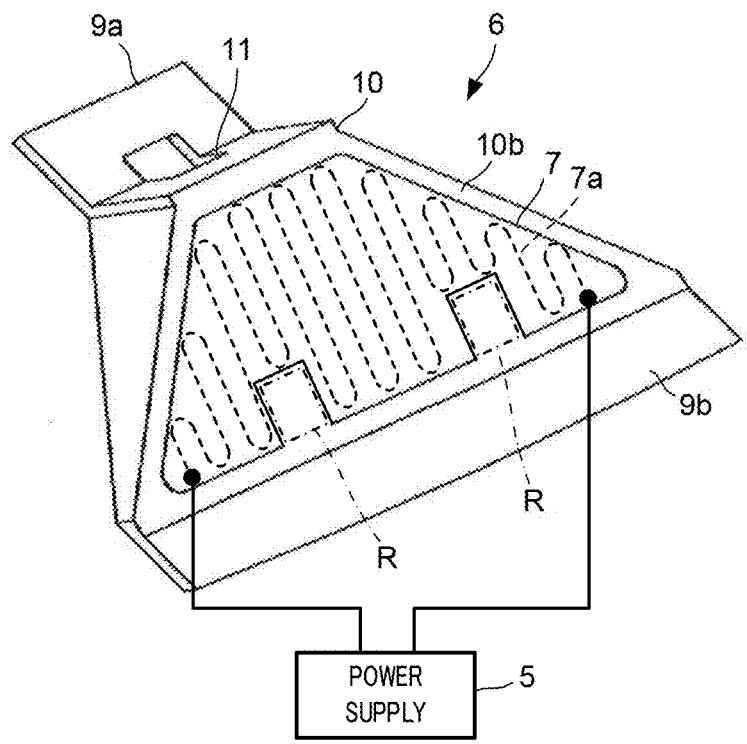
FIG. 3 illustrates a configuration of the supporting section on the back surface side.

FIG. 3 illustrates a configuration of supporting section 6 on the side of back surface 10b.

Heating section 7 is placed on back surface 10b of supporting section 6. Here, on back surface 10b of supporting section 6, holding section 2a that holds image capturing section 2 is assumed to be fixed to fixing areas R. Thus, heating section 7 is placed in a shape to avoid fixing areas R.

Heating wire 7a is placed over the entire surface of heating section 7, and power supply 5 is connected to a pair of terminals of heating wire 7a. Heating wire 7a has a predetermined resistance so as to be heated by energization from power supply 5.

Next, an operation in Embodiment 1 will be described.

First, as illustrated in FIG. 1, image capturing section 2 fixed to supporting section 6 via holding section 2a is placed so as to be exposed from window section 11 to the windshield F side, and captures an image of the outside of the vehicle through windshield F.

At this time, as illustrated in FIG. 2, supporting section 6 is fixed to windshield F by fixing sections 9a to 9d placed so as to surround bent section 10. This enables firm support of image capturing section 2.

Facing surface 10a and side surfaces 10d and 10e of bent section 10 are placed so as to extend in right-left direction D2 from the window section 11 side toward detection direction D1 of image capturing section 2, thereby forming detection space S corresponding to the image capturing range of image capturing section 2. With this detection space S, image capturing section 2 can reliably capture an image of the outside the vehicle without any obstruction in the image capturing range.

Here, when the temperature outside the vehicle is lowered, windshield F is fogged up, which possibly hinders image capture of image capturing section 2. Thus, temperature measurement section 3 measures the temperature outside the vehicle, and outputs the temperature to control section 4. Control section 4 determines whether the temperature measured by temperature measurement section 3 is equal to or lower than a predetermined value and turns power supply 5 on when the temperature is equal to or lower than the predetermined value.

As illustrated in FIG. 3, this allows power supply 5 to supply power to heating wire 7a of heating section 7, and heating section 7 heats back surface 10b of bent section 10. The heat of heating section 7 is conducted from the back surface 10b side of bent section 10 to the facing surface 10a side and is inputted to conducting section 8. Conducting section 8 then conducts along facing surface 10a the heat conducted from heating section 7, and dissipates the heat toward windshield F into detection space S. As a result, the heat dissipated to detection space S warms windshield F and removes fogging from windshield F.

At this time, conducting section 8 is placed so as to extend along facing surface 10a. Meanwhile, heating section 7 is placed so as to avoid fixing areas R where holding section 2a is fixed. Various devices are placed on the back surface 10b side of supporting section 6 in addition to holding section 2a, and thus heating section 7 is subject to various restrictions besides fixing areas R, for example, placed in a narrower range. That is, while placing heating section 7 on the back surface 10b side makes it easier to install a wire, for example, the installation area is possibly limited.

As described above, when heating section 7 is placed so as to avoid a part of back surface 10b and the heat of heating section 7 is dissipated to detection space S as it is, except for conducting section 8, the fogging of windshield F remains partially and it hinders image capture of image capturing section 2, thereby possibly deteriorating the image capturing accuracy.

With this regard, as illustrated in FIG. 2, placing conducting section 8 so as to extend along facing surface 10a allows the heat conducted from heating section 7 to be conducted broadly and uniformly along facing surface 10a. This removes the fogging of windshield F in a wide range, and prevents deterioration of the image capturing accuracy, i.e., the detection accuracy, of image capturing section 2.

In addition, conducting section 8 is placed so as to cover the entire surface of facing surface 10a. This makes it possible to remove the fogging of the entire area corresponding to detection space S of windshield F, i.e., the entire detection area of image capturing section 2, thereby reliably preventing deterioration of the image capturing accuracy of image capturing section 2.

Meanwhile, when the temperature measured by temperature measurement section 3 is higher than the predetermined value, control section 4 turns power supply 5 off.

In this manner, control section 4 controls the heating by heating section 7 based on the temperature measured by temperature measurement section 3, and this prevents the fogging of windshield F and the image capturing accuracy of image capturing section 2 is maintained accordingly.

In the present embodiment, conducting section 8 is placed so as to extend along facing surface 10a, and thus the heat conducted from heating section 7 can be uniformly conducted along facing surface 10a. This removes the fogging of windshield F in a wide range and prevents deterioration of the image capturing accuracy of image capturing section 2.

Embodiment 2

Embodiment 2 of the present disclosure will be described below. The description here is mainly about a difference from Embodiment 1 described above. As for the sections in common with Embodiment 1, the same reference signs will be used and the detailed description thereof is omitted.

In Embodiment 1 described above, conducting section 8 is placed on facing surface 10a, but is not limited to this and only needs to be placed along facing surface 10a.

Figure 4:
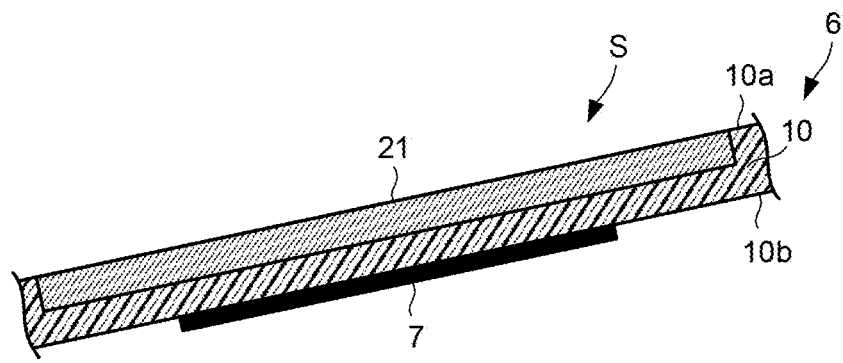
FIG. 4 illustrates a configuration of a conducting section according to Embodiment 2.

For example, as illustrated in FIG. 4, conducting section 21 can be placed instead of conducting section 8 of Embodiment 1.

Conducting section 21 is placed so as to extend along facing surface 10a of bent section 10 and is embedded in bent section 10 so that its surface is exposed to detection space S. Here, conducting section 21 is placed so that its surface is on the same plane as facing surface 10a of bent section 10.

This allows conducting section 21 to conduct the heat conducted from heating section 7 broadly and uniformly along facing surface 10a, thereby removing the fogging of windshield F in a wide range and preventing deterioration of the image capturing accuracy of image capturing section 2.

In addition, conducting section 21 is embedded in bent section 10 so that its surface is exposed, and this reduces the amount of protrusion from facing surface 10a while maintaining the strength of supporting section 6. At this time, conducting section 21 is placed so that its surface is on the same plane as facing surface 10a of bent section 10, thereby eliminating the protrusion from facing surface 10a.

According to the present embodiment, conducting section 21 is embedded in bent section 10 so that its surface is exposed, and this reduces the amount of protrusion from facing surface 10a while maintaining the strength of supporting section 6.

Figure 5:
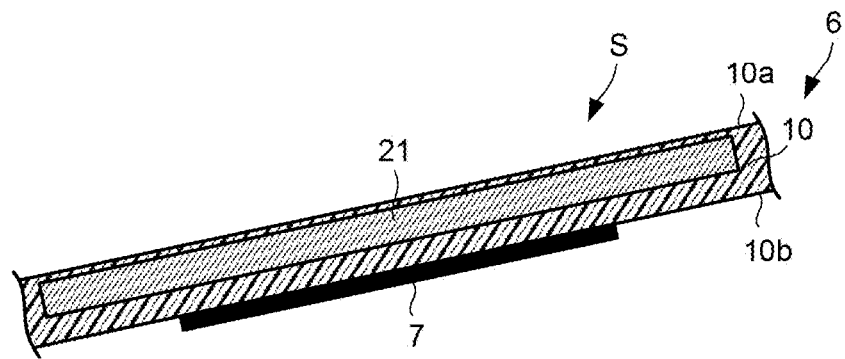
FIG. 5 illustrates a configuration of a conducting section according to a variation of Embodiment 2.

Note that, in the present embodiment, conducting section 21 is placed so that its surface is exposed, but is not limited to this and only need to be placed so as to extend along facing surface 10a. For example, as illustrated in FIG. 5, conducting section 21 may be completely embedded in bent section 10 to its surface so as to extend along facing surface 10a. At this time, conducting section 21 is embedded so that the distance to facing surface 10a is shorter than the distance to back surface 10b.

Embodiment 3

Embodiment 3 of the present disclosure will be described below. The description here is mainly about a difference from Embodiments 1 and 2 described above. As for the sections in common with Embodiments 1 and 2, the same reference signs will be used and the detailed description thereof is omitted.

In Embodiment 1 and 2 described above, the conducting section is placed so as to extend along facing surface 10a only, but is not limited to this and only needs to be placed so as to extend along facing surface 10a.

Figure 6:
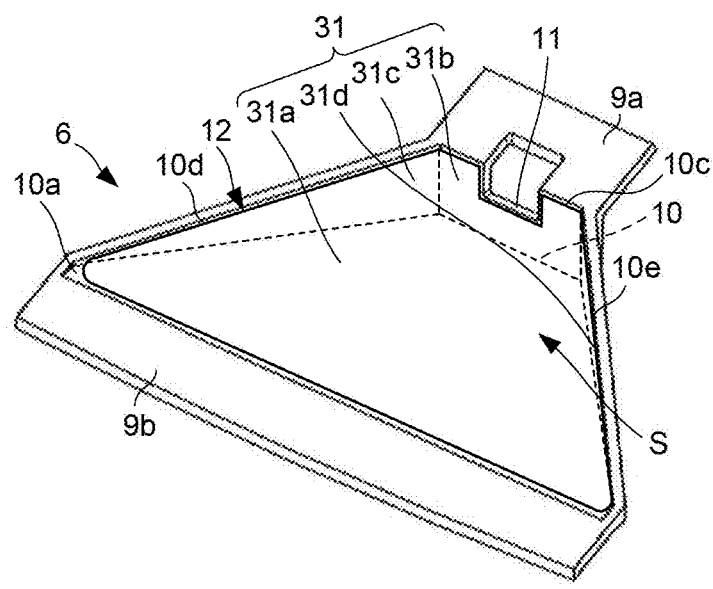
FIG. 6 illustrates a configuration of a conducting section according to Embodiment 3.

For example, as illustrated in FIG. 6, conducting section 31 can be placed instead of conducting section 8 of Embodiment 1.

Conducting section 31 includes bottom section 31a and three side wall sections 31b to 31d. Bottom section 31a is in a plate shape and is placed along facing surface 10a of bent section 10 so as to extend over facing surface 10a. Side wall section 31b is in a plate shape and is placed along side surface 10c of bent section 10 so as to extend over side surface 10c. Side wall section 31c is in a plate shape and is placed along side surface 10d of bent section 10 so as to extend over side surface 10d. Side wall section 31d is in a plate shape and is placed along side surface 10e of bent section 10 so as to extend over side surface 10e. These bottom section 31a and side wall sections 31b to 31d are integrally connected to each other at their edges.

This allows bottom section 31a of conducting section 31 to conduct the heat conducted from heating section 7 broadly and uniformly along facing surface 10a of bent section 10. Side wall sections 31b to 31d then uniformly conducts the heat conducted by bottom section 31a along side surfaces 10c to 10e of bent section 10. As described above, conducting section 31 conducts the heat conducted from heating section 7 along facing surface 10a and side surfaces 10c to 10e, thereby warming entire detection space S and easily removing fogging from windshield F. This makes it possible to reliably prevent deterioration of the image capturing accuracy of image capturing section 2.

According to the present embodiment, conducting section 31 is placed so that bottom section 31a extends along facing surface 10a of bent section 10 and side wall sections 31b to 31d respectively extend along side surfaces 10c to 10e of bent section 10. This warms entire detection space S and reliably prevents deterioration of the image capturing accuracy of image capturing section 2.

Embodiment 4

Embodiment 4 of the present disclosure will be described below. The description here is mainly about a difference from Embodiments 1 to 3 described above. As for the sections in common with Embodiments 1 to 3, the same reference signs will be used and the detailed description thereof is omitted.

In Embodiments 1 to 3 described above, the conducting section is formed to have a uniform thickness, but is not limited to this and only needs to be placed so as to extend along facing surface 10a.

Figure 7:
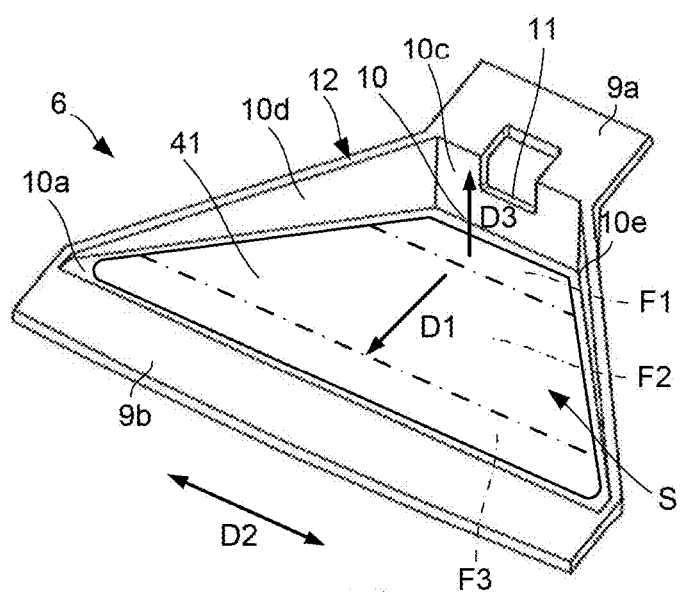
FIG. 7 illustrates a configuration of a conducting section according to Embodiment 4.

For example, as illustrated in FIG. 7, conducting section 41 can be placed instead of conducting section 8 of Embodiment 1.

Conducting section 41 is formed so that spaced area F1, which is located farthest from windshield F in heat dissipation direction D3 directed upward from facing surface 10a, is thicker than an area closer to windshield F than spaced area F1 in heat dissipation direction D3, for example, middle area F2. In addition, conducting section 41 is formed so that edge area F3 on the side of fixing section 9b, which is formed longest among the four edges, is thicker than an area away from the edge, for example, middle area F2.

This allows conducting section 41 to conduct the heat conducted from heating section 7 broadly along facing surface 10a of bent section 10. At this time, spaced area F1 and edge area F3 of conducting section 41 are formed thicker than middle area F2.

Generally, the farther the distance from conducting section 41 to windshield F in heat dissipation direction D3 is, the more difficult it is to remove the fogging of windshield F because the heat dissipated from conducting section 41 is cooled while transferring through detection space S.

Further, it is difficult to remove the fogging of windshield F at the sections corresponding to the edges of conducting section 41 on windshield F because the sections are cooled by outside air from the outside. In particular, it is difficult to remove the fogging of windshield F at the section corresponding to edge area F3 on windshield F because it is formed long in right-left direction D2.

With this regard, spaced area F1 of conducting section 41 is formed thicker. This increases the amount of the heat dissipated from spaced area F1, and enables conducting section 41 to reliably remove the fogging at the section far from conducting section 41 on windshield F.

Further, edge area F3 of conducting section 41 is formed thicker. This increases the amount of the heat dissipated from edge area F3, and enables conducting section 41 to reliably remove the fogging at the section easily cooled by the outside air on windshield F. At this time, edge area F3 is set around the edge formed longest in conducting section 41, and it is thus possible to reliably remove the fogging at the section most likely to be cooled by the outside air on windshield F.

Note that, in the present embodiment, conducting section 41 is formed to have thick edge area F3, but is not limited to this and only needs to be formed to have a thick area around the edge.

According to the present embodiment, conducting section 41 is formed to have thick spaced area F1, which is located farthest from windshield F in heat dissipation direction D3, thereby reliably removing the fogging of windshield F. Further, conducting section 41 is formed thick around the edge, thereby reliably removing the fogging of windshield F.

Note that, in Embodiments 1 to 4 described above, the conducting section is formed in a plate shape, but is not limited to being in a plate shape and only needs to be placed so as to extend along facing surface 10a of bent section 10. For example, the conducting section may be formed in mesh.

Additionally, in Embodiments 1 to 4 described above, attachment apparatus 1 is provided with image capturing section 2 for detecting transmitted light, but is not limited to being provided with image capturing section 2 and only needs to be provided with a sensor for detecting a transmitted wave transmitted through windshield F. For example, attachment apparatus 1 can also be configured to be provided with a sensor such as a laser radar, millimeter-wave radar, and ultrasound sensor.

Note that the transmitted wave is a wave having a predetermined frequency, and may be, for example, visible light, ultraviolet light, infrared light, a millimeter wave, ultrasound, and the like.

Further, in Embodiments 1 to 4 described above, attachment apparatus 1 attaches image capturing section 2 to windshield F, but windshield F is not the only option and image capturing section 2 only needs to be attached to a transparent plate that transmits transmitted light.

Furthermore, in Embodiments 1 to 4 described above, supporting section 6 is directly fixed to windshield F, but this is not the only option and supporting section 6 only needs to be fixed between windshield F and image capturing section 2.

The all of the above embodiments are merely examples to implement the present invention, and the technical scope of the present invention should not be interpreted as limited by these embodiments. In other words, the present invention can be implemented in various forms without departing from the gist or main features thereof. For example, the disclosure on the components described in the above embodiments (e.g., shapes and numbers) is merely an example, and the present disclosure can be implemented with modifications as appropriate.

The disclosure of Japanese Patent Application No. 2020-025232, filed on Feb. 18, 2020, including the specification, drawings and abstract, is incorporated herein by reference in its entirety.

INDUSTRIAL APPLICABILITY

An attachment apparatus according to the present disclosure is useful for an apparatus attaching a sensor to a transparent plate.

REFERENCE SIGNS LIST

1 Attachment apparatus
2 Image capturing section
2a Holding section
3 Temperature measurement section
4 Control section
5 Power supply
6 Supporting section
7 Heating section
7a Heating wire
8, 21, 31, 41 Conducting section
31a Bottom section
31b to 31d Side wall section
9a to 9d Fixing section
10 Bent section
10a Facing surface
10b Back surface
10c to 10e Side surface
11 Window section
12 Opening section
F Windshield
Fa, Fb Surface
S Detection space
D1 Detection direction
D2 Right-left direction
D3 Heat dissipation direction
R Fixing area
F1 Spaced area
F2 Middle area
F3 Edge area

The invention claimed is:

1. An attachment apparatus that attaches a sensor on a side of one surface of a transparent plate so as to detect a transmitted wave transmitted from a side of another surface of the transparent plate, the attachment apparatus comprising:
a supporting section that is fixed between the transparent plate and the sensor, and is formed with a bent section recessed in a direction away from the transparent plate, the bent section being formed with a window section facing an opening section of the bent section to expose the sensor to a side of the transparent plate, the bent section including a facing surface formed so as to face the transparent plate while being away from the opening section toward the window section;
a heating section that is placed on a back surface on an opposite side of the facing surface of the bent section; and
a conducting section that is placed so as to extend along the facing surface, and conducts, along the facing surface, heat conducted from the heating section, wherein,
the heat conducted by the conducting section is dissipated toward the transparent plate, and the conducting section is embedded into the bent section so that a surface of the conducting section is exposed.

2. The attachment apparatus according to claim 1, wherein,
the bent section includes a side surface erected from the facing surface to the transparent plate, and
the conducting section is placed so as to further extend along the side surface.

3. The attachment apparatus according to claim 1, wherein,
the transparent plate is a windshield of a vehicle, and
the sensor is an image capturing section that captures an image on the side of one surface of the transparent plate.

4. An attachment apparatus that attaches a sensor on a side of one surface of a transparent plate so as to detect a transmitted wave transmitted from a side of another surface of the transparent plate, the attachment apparatus comprising:
a supporting section that is fixed between the transparent plate and the sensor, and is formed with a bent section recessed in a direction away from the transparent plate, the bent section being formed with a window section facing an opening section of the bent section to expose the sensor to a side of the transparent plate, the bent section including a facing surface formed so as to face the transparent plate while being away from the opening section toward the window section;
a heating section that is placed on a back surface on an opposite side of the facing surface of the bent section; and
a conducting section that is placed so as to extend along the facing surface, and conducts, along the facing surface, heat conducted from the heating section, wherein,
the heat conducted by the conducting section is dissipated toward the transparent plate, and the conducting section is formed thick in an area farthest from the transparent plate in a heat dissipation direction.

5. An attachment apparatus that attaches a sensor on a side of one surface of a transparent plate so as to detect a transmitted wave transmitted from a side of another surface of the transparent plate, the attachment apparatus comprising:
a supporting section that is fixed between the transparent plate and the sensor, and is formed with a bent section recessed in a direction away from the transparent plate, the bent section being formed with a window section facing an opening section of the bent section to expose the sensor to a side of the transparent plate, the bent section including a facing surface formed so as to face the transparent plate while being away from the opening section toward the window section;
a heating section that is placed on a back surface on an opposite side of the facing surface of the bent section; and
a conducting section that is placed so as to extend along the facing surface, and conducts, along the facing surface, heat conducted from the heating section, wherein,
the heat conducted by the conducting section is dissipated toward the transparent plate, and the conducting section is formed thick around an edge.

* * * * *